United States Patent
Lan (10) Patent No.: US 11,518,939 B2
(45) Date of Patent: Dec. 6, 2022

(54) POLYMER-DISPERSED LIQUID CRYSTAL COMPOSITION, PREPARATION METHOD OF POLYMER-DISPERSED LIQUID CRYSTAL FILM, AND DISPLAY PANEL

(71) Applicant: Shenzhen China Star Optoelectronics Semiconductor Display Technology Co., Ltd., Guangdong (CN)

(72) Inventor: Song Lan, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 469 days.

(21) Appl. No.: 16/621,670

(22) PCT Filed: Nov. 5, 2019

(86) PCT No.: PCT/CN2019/115470
§ 371 (c)(1),
(2) Date: Dec. 11, 2019

(87) PCT Pub. No.: WO2021/046994
PCT Pub. Date: Mar. 18, 2021

(65) Prior Publication Data
US 2021/0079299 A1    Mar. 18, 2021

(30) Foreign Application Priority Data

Sep. 12, 2019 (CN) .......................... 201910867176.X (51) Int. Cl.
*C09K 19/54* (2006.01)
*C08G 73/10* (2006.01)
(Continued)

(52) U.S. Cl.
CPC ........ *C09K 19/544* (2013.01); *C08G 73/1007* (2013.01); *C08G 73/1032* (2013.01);
(Continued)

(58) Field of Classification Search
CPC ............. C09K 19/544; C08G 73/1067; C08G 73/1071; C08G 73/1042; C08G 73/1039; G02F 1/1334; G02F 1/133723; C08J 5/18
(Continued)

(56) References Cited

U.S. PATENT DOCUMENTS

2010/0073605 A1    3/2010  Masutani et al.
2010/0279125 A1    11/2010 Buyuktanir et al.

FOREIGN PATENT DOCUMENTS

CN    101611117 A    12/2009
CN    102967962 A    3/2013
(Continued)

OTHER PUBLICATIONS

Liquid Crystals, Dong Wang-Study on the electro-optical properties of polyimide-based polymer-dispersed liquid crystal films.
(Continued)

*Primary Examiner* — Ruiyun Zhang
(74) *Attorney, Agent, or Firm* — PV IP PC; Wei Te Chung; Ude Lu (57) ABSTRACT

A polymer-dispersed liquid crystal composition, a preparation method of a polymer-dispersed liquid crystal film, and a display panel are provided. The polymer-dispersed liquid crystal composition includes a prepolymer and a liquid crystal molecule, wherein the prepolymer is a fluorine-containing polyimide precursor chemically bonded to a polyaniline, including a polycondensation unit formed from a fluorine-containing dianhydride monomer and a fluorine-containing diamine monomer. In the present application, the conductive polyaniline is chemically bonded to the fluorine-containing polyimide precursor to increase the conductivity of the polyimide precursor. Further, a polymer-dispersed
(Continued)

liquid crystal film having a driving voltage lower than 30 V and excellent insulating property and radiation resistance is obtained.

16 Claims, 2 Drawing Sheets

(51) Int. Cl.
*G02F 1/1334* (2006.01)
*G02F 1/1337* (2006.01)

(52) U.S. Cl.
CPC ..... *C08G 73/1042* (2013.01); *C08G 73/1067* (2013.01); *C08G 73/1071* (2013.01); *G02F 1/1334* (2013.01); *G02F 1/133723* (2013.01); *C08G 73/1039* (2013.01)

(58) Field of Classification Search
USPC .......................... 428/1.1; 252/299.01, 299.4
See application file for complete search history.

(56) References Cited

FOREIGN PATENT DOCUMENTS

| | | |
|---|---|---|
| CN | 103724624 A | 4/2014 |
| CN | 104345507 A | 2/2015 |

OTHER PUBLICATIONS

European Polymer Journal, Kung-Chin Chang-Synthesis of ultra-high-strength electroactive polyimide membranes containing oligoaniline in the main chain by thermal imidization reaction.

POLYMER-DISPERSED LIQUID CRYSTAL COMPOSITION, PREPARATION METHOD OF POLYMER-DISPERSED LIQUID CRYSTAL FILM, AND DISPLAY PANEL

FIELD OF INVENTION

The present application relates to the field of display technology, and in particular, to a polymer-dispersed liquid crystal composition, a method for preparing a polymer-dispersed liquid crystal film and a display panel.

BACKGROUND OF INVENTION

Polymer-dispersed liquid crystal (PDLC) is a structure in which a low molecular weight liquid crystal is mixed with a prepolymer and polymerized under certain conditions to form a micron-sized liquid crystal droplet uniformly dispersed in a polymer network. Due to the dielectric anisotropy of liquid crystal molecules, the polymer-dispersed liquid crystal is a material having electro-optic response characteristics.

The polymer-dispersed liquid crystal film made of the polymer-dispersed liquid crystal is an excellent film material that combines a liquid crystal and a polymer. Since liquid crystal molecules impart significant electro-optical properties to polymer-dispersed liquid crystal films, they have been widely concerned and have broad application prospects.

Compared with conventional display devices, polymer-dispersed liquid crystal displays have many advantages, such as a polarizer and an alignment layer are not required, the preparation process thereof is simple, and it is easy to be made into a large-area flexible display or the like. At present, polymer-dispersed liquid crystal films have been widely used in optical modulators, heat-sensitive and pressure-sensitive devices, electronically controlled glass, light valves, projection displays, and electronic books.

Technical Problem

Since the polymer matrix of the polymer-dispersed liquid crystal film currently used is mostly polyacrylate, epoxy resin, and mercaptan, it has disadvantages of low temperature resistance, poor chemical stability, poor mechanical strength, and poor radiation resistance, which limits the application of the polymer-dispersed liquid crystal film. The polymer-dispersed liquid crystal film using polyimide as a polymer matrix, which is currently known, has a problem that the driving voltage exceeds 50V. Therefore, it is necessary to propose a new material to solve the problem that the currently known polymer-dispersed liquid crystal film has a high driving voltage or poor comprehensive performance to overcome the above drawbacks.

SUMMARY OF INVENTION

An object of the present application is to provide a monomer mixture and a polymer-dispersed liquid crystal composition, for forming a polymer-dispersed liquid crystal film. The polymer-dispersed liquid crystal composition is introduced into conductive polyaniline by a chemical bond, thereby obtaining a polymer-dispersed liquid crystal film having a low driving voltage, which expands an application of the polymer-dispersed liquid crystal film.

In order to achieve the above object, according to an aspect of the present application, a monomer mixture which can be used for forming a polymer-dispersed liquid crystal film is provided. The prepolymer includes a fluorine-containing dianhydride monomer, a fluorine-containing diamine monomer, and a polyaniline, wherein the fluorine-containing dianhydride monomer has a structure represented by any one of the formulas (i-1) to (i-3):

Formula (i-1)

Formula (i-2)

Formula (i-3)

Further, the fluorine-containing diamine monomer has any of the structures represented by formulas (ii-1) to (ii-4):

Formula (ii-1)

Formula (ii-2)

Formula (ii-3)

Formula (ii-4)

In one embodiment, the polyaniline has a structure shown in formula (iii):

Formula (iii)

where n is 3 to 5.

In one embodiment, the prepolymer further includes a solvent. Preferably, a mass fraction of the solvent is 90% based on the total mass of the prepolymer.

In one embodiment, the solvent is N-methyl pyrrolidone (NMP) or N-ethyl pyrrolidone (NEP).

According to another aspect of the present application, a polymer-dispersed liquid crystal composition is provided, including a prepolymer and a liquid crystal molecule, wherein the prepolymer is a fluorine-containing polyimide precursor chemically bonded to the polyaniline.

In one embodiment, the fluorine-containing polyimide precursor includes a polycondensation unit formed from a fluorine-containing dianhydride monomer and a fluorine-containing diamine monomer; wherein the fluorine-containing dianhydride monomer has any one of the structures represented by formulas (i-1) to (i-3):

Formula (i-1)

Formula (i-2)

Further, the fluorine-containing diamine monomer has any of the structures represented by formulas (ii-1) to (ii-4):

Formula (ii-1)

Formula (ii-2)

Formula (ii-3)

Formula (ii-4)

In one embodiment, the prepolymer has a structure shown in formula (I):

Formula (I)

-continued

Formula (i-3)

wherein Ar1 is selected from any one of:

Ar2 is selected from any one of:

wherein n is 3 to 5.

In one embodiment, a mass ratio of the prepolymer to the liquid crystal molecule is (70-90):(10-30).

According to another aspect of the present application, a method for preparing a polymer-dispersed liquid crystal film is further provided, including:

a step of obtaining polyamic acid: reacting a prepolymer of any of the above polymer-dispersed liquid crystal at room temperature to obtain a polyamic acid;

a step of forming a polymer film: forming a polymer film by reacting the polyamic acid at a high temperature; and a step of forming the polymer-dispersed liquid crystal film: mixing liquid crystal material and the polymer film, then melting the mixed liquid crystal material and the polymer film and cooling the melted mixed liquid crystal material and the polymer film to form the polymer-dispersed liquid crystal film.

According to another aspect of the present application, a method for preparing a polymer-dispersed liquid crystal film is further provided, including:

a step of obtaining a polyamic acid by reacting a fluorine-containing dianhydride monomer, a fluorine-containing diamine monomer, and a polyaniline at room temperature;

a step of forming a polymer film by reacting the polyamic acid at a high temperature; and a step of mixing liquid crystal material and the polymer film, melting the mixed liquid crystal material and the polymer film and cooling the melted mixed liquid crystal material and the polymer film to form the polymer-dispersed liquid crystal film.

In one embodiment, in the step of obtaining a polyamic acid, the polyamic acid is obtained by completely reacting any of the above prepolymers at room temperature.

In one embodiment, in the step of forming a polymer film, the obtained polyamic acid is first reacted at 80° C. to 100° C. for 1 to 3 hours and then reacted at 200° C. to 230° C. for 1 to 3 hours to obtain a polymer film.

In one embodiment, in the step of forming the polymer-dispersed liquid crystal film, the liquid crystal material and the obtained polymer film are mixed at a mass ratio of (70-90):(10-30) and melted at a high temperature, thereafter, the film is cooled at a temperature drop rate of 5° C. to 10° C./minute to obtain the polymer-dispersed liquid crystal film.

According to another aspect of the present application, a display panel is further provided, including a first substrate and an opposite substrate disposed in parallel with the first substrate; and a polymer-dispersed liquid crystal film interposed between the first substrate and the opposite substrate; wherein the polymer-dispersed liquid crystal film is prepared by mixing any of the above prepolymers with liquid crystal molecules or prepared by any of the above polymer-dispersed liquid crystal compositions or prepared by any of the above preparation methods.

In one embodiment, the display panel further includes a first electrode and a second electrode, and the first electrode is disposed on a surface of the first substrate facing the opposite substrate, and the second electrode is disposed on a surface of the opposite substrate facing the first substrate, and the polymer-dispersed liquid crystal film contacts the first electrode and the second electrode.

In one embodiment, at least one of the first electrode or the second electrode is an indium tin oxide (ITO) thin-film electrode.

Beneficial Effect

In the present application, conductive polyaniline is introduced into a fluorine-containing polyimide precursor in a chemical bonding manner to increase the conductivity of the polyimide precursor. It has been experimentally shown that the driving voltage of the polymer-dispersed liquid crystal film described in the present application is lower than 30V. In addition, it has excellent performances such as high-temperature resistance and low-temperature resistance, high strength and high modulus, low thermal expansion coefficient and dielectric constant, excellent insulation performance and radiation resistance. Therefore, the polymer-dispersed liquid crystal film described in the present application can be applied to a display panel or a display device. The problems that the current polymer-dispersed liquid crystal films have high driving voltage (higher than 50V) and poor comprehensive performance are effectively solved.

DETAILED DESCRIPTION OF PREFERRED EMBODIMENTS

The technology of the present application will be described in detail below in conjunction with specific embodiments. It should be understood that the following specific embodiments are only used to assist those skilled in the art to understand the present application and not to limit the application.

Embodiment 1, Prepolymer of Polymer-Dispersed Liquid Crystal

In this embodiment, a monomer mixture is provided which can be used to form a polymer-dispersed liquid crystal film. The prepolymer includes a fluorine-containing dianhydride monomer, a fluorine-containing diamine monomer and a polyaniline, and a solvent. The solvent is N-methyl pyrrolidone (NMP) or N-ethyl pyrrolidone (NEP) and has a mass fraction of 90% based on the total mass of the prepolymer.

The fluorine-containing dianhydride monomer has any one of the structures represented by the formulas (i-1) to (i-3):

Formula (i-1)

Formula (i-2)

Formula (i-3)

The fluorine-containing diamine monomer has any one of structures represented by formulas (ii-1) to (ii-4):

Formula (ii-1)

Formula (ii-2)

Formula (ii-3)

Formula (ii-4)

The polyaniline has the structure shown in formula (iii):

$$H_2N \text{—} \left( \text{—} \bigcirc \text{—} NH \text{—} \bigcirc \text{—} \right)_n \text{—} NH_2;$$

Formula (iii)

n is from 3 to 5.

Embodiment 2, Prepolymer of Polymer-Dispersed Liquid Crystal

In this embodiment, a polymer-dispersed liquid crystal prepolymer is provided which can be used to form the polymer-dispersed liquid crystal film. The prepolymer includes a fluorine-containing dianhydride monomer, a fluorine-containing diamine monomer, a polyaniline, and a solvent. The solvent is N-methyl pyrrolidone (NMP) or N-ethyl pyrrolidone (NEP) and has a mass fraction of 90% based on the total mass of the prepolymer.

The fluorine-containing dianhydride monomer has a structure represented by formula i-1, the fluorine-containing diamine monomer has a structure represented by the formula ii-4, and the polyaniline has a structure represented by the formula iii, and n is 4.

In the prepolymer of the present embodiment, the molar ratio of the fluorine-containing dianhydride monomer, the fluorine-containing diamine monomer, and the polyaniline is 10:9:1.

Embodiment 3, Polymer-Dispersed Liquid Crystal Composition

In the present embodiment, a polymer-dispersed liquid crystal composition is provided. The polymer-dispersed liquid crystal composition includes the prepolymer and liquid crystal molecules described in embodiment 1. The liquid crystal molecules are liquid crystal molecules commonly used in the field and will not be described herein. In this embodiment, the prepolymer has a structure represented by any one of the formula (I-1) to formula (I-12), and n is 3 to 5:

Formula (I-1)

Formula (I-2)

Formula (I-3)

Formula (I-4)

Formula (I-5)

Formula (I-6)

Formula (I-7)

Formula (I-8)

Embodiment 4, Polymer Film A

In this embodiment, a polymer film A is provided, the polymer film A is made of the prepolymer described in embodiment 2. In the present embodiment, the prepolymer of the polymer film A has a structure represented by formula (I-4), and n is 4.

Figure 1:
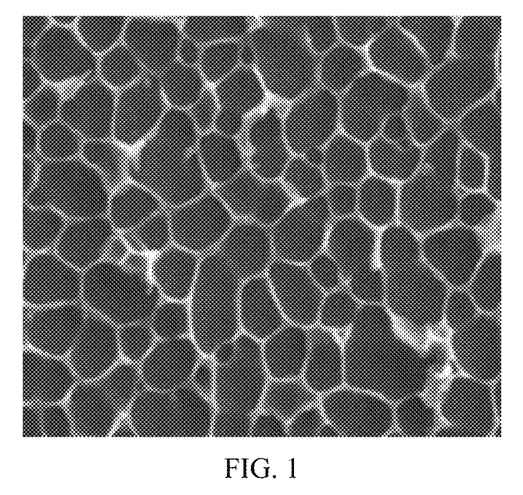
FIG. 1 is an image of a polymer film in accordance with an embodiment of the present application captured by a scanning electron microscope.

The preparation method of the polymer film A is specifically as follows:

(1) A fluorine-containing dianhydride monomer represented by formula (i-1), a fluorine-containing diamine monomer represented by formula (ii-4), and conductive polyaniline represented by formula (iii) of a molar ratio of 10:9:1 are dissolved in a solvent NEP or NMP such that the mass fraction of the solvent is 90%; and (2) After reacting at room temperature for 24 hours, a polyamic acid is obtained, which has the following structure:

(3) Subsequently, the polyamic acid is first reacted at 80° C. to 100° C. for 1 to 3 hours, and then, a film is formed by reacting at 200° C. to 230° C. for 1 to 3 hours to obtain a polymer film A, which is a conductive polyimide film. A scanning electron microscope image of the polymer film A is shown in FIG. 1. As shown in FIG. 1, in the polymer film A of the present embodiment, a uniform polymer network is formed, which is suitable for preparing a polymer-dispersed liquid crystal film.

Embodiment 5, Polymer-Dispersed Liquid Crystal Film

In this embodiment, a polymer-dispersed liquid crystal film is provided, and the specific preparation method is as follows:

After the prepolymer and the liquid crystal material described in embodiment 4 are mixed at a mass ratio of (70-90):(10-30), and then melted at 100 to 150° C., subsequently, cooled at a temperature drop rate of 5° C. to 10° C./minute to obtain the polymer-dispersed liquid crystal film.

It is understood by those skilled in the art that the liquid crystal material described in this embodiment is a conventional liquid crystal material known in the art, and details are not described herein. In addition, when the polymer-dispersed liquid crystal film is applied to a display panel, a molten polymer A and a liquid crystal material are injected into a liquid crystal cell, and then cooled at a temperature drop rate of 5° C. to 10° C./minute, so that the polymer-dispersed liquid crystal film is formed in a liquid crystal cell.

It has been experimentally found that the polymer-dispersed liquid crystal film has excellent properties such as high and low temperature resistance, high strength and high modulus, low thermal expansion coefficient and dielectric constant, excellent insulating properties and radiation resistance.

Embodiment 6, a Display Panel

Figure 2:
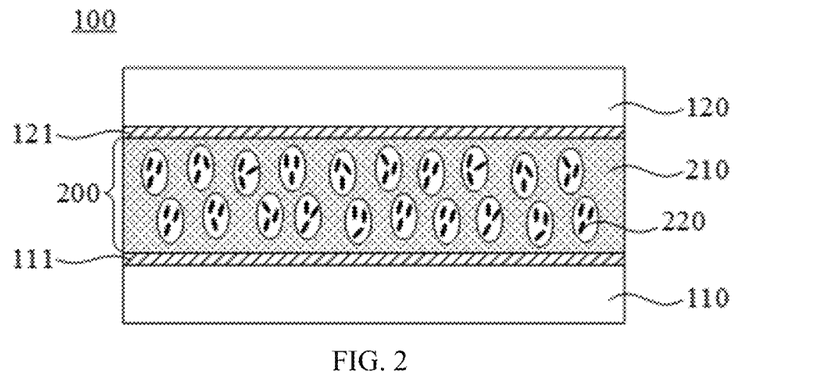
FIG. 2 is a schematic structural diagram of a display panel according to an embodiment of the present application.

Please refer to FIG. 2, in the embodiment, a display panel 100 is provided. As shown in FIG. 2, the display panel 100 includes: a first substrate 110 and an opposite substrate 120 disposed in parallel with the first substrate 110; a first electrode 111 disposed on a surface of the first substrate 110 facing the opposite substrate 120, a second electrode 121 disposed on a surface of the opposite substrate 120 facing the first substrate 110; and a polymer-dispersed liquid crystal film 200 interposed between the first substrate 110 and the opposite substrate 120 and in contact with the first electrode and the second electrode.

As shown in FIG. 2, the polymer-dispersed liquid crystal film 200 includes a polymer film 210 that has been formed into a film, and liquid crystal molecules 220 dispersed in the polymer film 210. The polymer-dispersed liquid crystal film 200 may be the polymer-dispersed liquid crystal film described in embodiment 5.

Figure 3A:
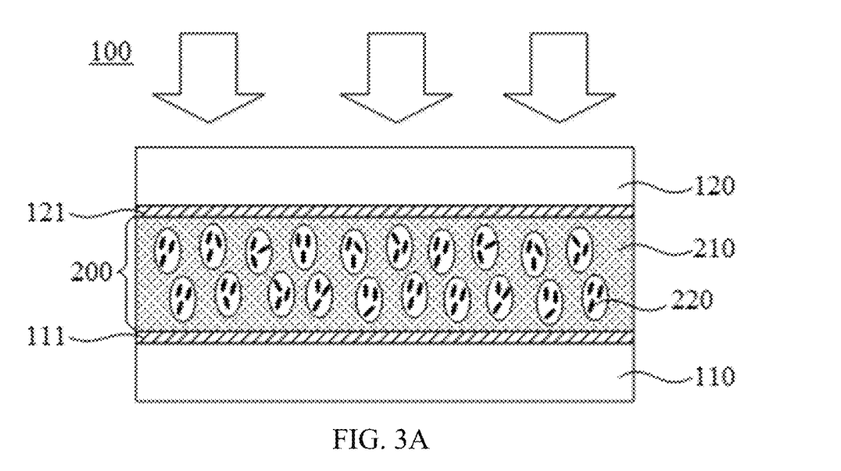
FIGS. 3A and 3B are light transmission schematic diagrams of the display panel shown in FIG. 2.
Figure 3B:
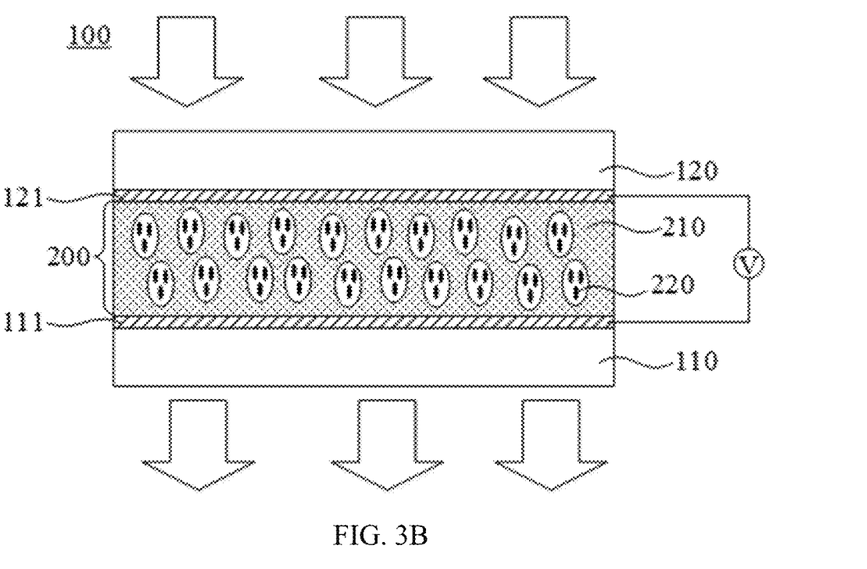

As shown in FIG. 3A, due to the dielectric anisotropy of the liquid crystal molecules 220, the polymer-dispersed liquid crystal film 200 is opaque when no voltage is applied to the first electrode 111 and the second electrode 121, that is, the display panel has no display effect. However, when a voltage is applied to the first electrode 111 and the second electrode 121, as shown in FIG. 3B, the polymer-dispersed liquid crystal film 200 is transparent, that is, the display panel is displayed. And the experiment shows that a driving voltage of the display panel 100 is lower than 30V. The display panel 100 of the present embodiment has a significant advantageous effect compared to a driving voltage of more than 50 V of the currently known same type display panel.

The present application has been described by the embodiments described above, but the embodiments are merely examples for implementing the present application. It should be noted that the disclosed embodiments do not limit the scope of the application. Conversely, modifications and equivalent arrangements are intended to be included within the scope of the claims.

INDUSTRIAL APPLICABILITY

The subject matter of the present application can be manufactured and used in the industry, and thus has industrial applicability.

What is claimed is:

1. A polymer-dispersed liquid crystal composition, comprising a liquid crystal molecule and a prepolymer, wherein the prepolymer is a fluorine-containing polyimide precursor chemically bonded to a polyaniline, comprising a polycondensation unit formed from a fluorine-containing dianhydride monomer and a fluorine-containing diamine monomer;

and wherein the fluorine-containing dianhydride monomer has any one of structures represented by formulas (i-1) to (i-3):

Formula (i-1)

Formula (i-2)

or

Formula (i-3)

and
the fluorine-containing diamine monomer has any one of structures represented by formulas (ii-1) to (ii-4):

Formula (ii-1)

Formula (ii-2)

Formula (ii-3)

or

Formula (ii-4)

2. The polymer-dispersed liquid crystal composition according to claim 1, wherein the prepolymer has a structure represented by formula (I):

Formula (I)

wherein Ar1 is selected from any one of:

or

Ar2 is selected from any one of:

-continued and n is from 3 to 5.

3. The polymer-dispersed liquid crystal composition according to claim 1, wherein a mass ratio of the prepolymer to the liquid crystal molecule is (70-90):(10-30).

4. A method for preparing a polymer-dispersed liquid crystal film, comprising:
- a step of obtaining polyamic acid: reacting a monomer mixture at room temperature to obtain a;
- a step of forming a polymer film: forming the polymer film by reacting the polyamic acid at a high temperature; and
- a step of forming the polymer-dispersed liquid crystal film: mixing liquid crystal material and the polymer film, melting the mixed liquid crystal material and the polymer film, and cooling the melted mixed liquid crystal material and the polymer film to form the polymer-dispersed liquid crystal film;

wherein the prepolymer of the polymer-dispersed liquid crystal comprises a fluorine-containing dianhydride monomer, a fluorine-containing diamine monomer, and a polyaniline, and the fluorine-containing dianhydride monomer has any one of structures represented by formulas (i-1) to (i-3):

Formula (i-1)

Formula (i-2)

Formula (i-3)

and the fluorine-containing diamine monomer has any one of structures represented by formulas (ii-1) to (ii-4):

Formula (ii-1)

Formula (ii-2)

Formula (ii-3)

Formula (ii-4)

5. The preparing method according to claim 4, wherein the polyaniline has a structure represented by formula (iii):

Formula (iii)

n is from 3 to 5.

6. The preparing method according to claim 4, wherein the monomer mixture further comprises a solvent.

7. The preparing method according to claim 6, wherein the solvent is N-methyl pyrrolidone or N-ethyl pyrrolidone.

8. The preparing method according to claim 6, wherein the solvent has a mass fraction of 90% based on a total mass of the monomer mixture.

9. The preparing method according to claim 4, wherein in the monomer mixture, a molar ratio of the fluorine-containing dianhydride monomer, the fluorine-containing diamine monomer, and the polyaniline is 10:9:1.

10. The preparing method according to claim 4, wherein in the step of forming the polymer film, reacting the obtained polyamic acid at 80° C. to 100° C. for 1 to 3 hours, and then further reacting the obtained polyamic acid at 200° C. to 230° C. for 1 to 3 hours to obtain the polymer film.

11. The preparing method according to claim 4, wherein in the step of forming the polymer-dispersed liquid crystal film, a mass ratio of the liquid crystal material to the obtained polymer film is (70-90):(10-30).

12. The preparing method according to claim 4, wherein in the step of forming the polymer-dispersed liquid crystal film, mixing the liquid crystal material with the obtained polymer film and then melted at a high temperature, and then cooled at a temperature drop rate of 5° C. to 10° C./minute to obtain the polymer-dispersed liquid crystal film.

13. A display panel, comprising a first substrate and an opposite substrate disposed in parallel with the first substrate; and a polymer-dispersed liquid crystal film interposed between the first substrate and the opposite substrate; wherein the polymer-dispersed liquid crystal film is made of the polymer-dispersed liquid crystal composition of claim 1.

14. The display panel according to claim 13, wherein the polymer-dispersed liquid crystal film is prepared by the method according to claim 4.

15. The display panel according to claim 13, wherein the display panel further comprises a first electrode and a second electrode, and the first electrode is disposed on a surface of the first substrate facing the opposite substrate, and the second electrode is disposed on a surface of the opposite substrate facing the first substrate, and the polymer-dispersed liquid crystal film contacts the first electrode and the second electrode.

16. The display panel according to claim 15, wherein at least one of the first electrode and the second electrode is an indium tin oxide (ITO) thin-film electrode.

* * * * *